United States Patent [19]

Disanza, Jr.

[11] E Patent Number: Re. 32,788

[45] Reissued Date of Patent: Nov. 22, 1988

[54] SEPARATION-CHAMBER MEANS

[76] Inventor: William G. Disanza, Jr., 25 Washington Ave., Hillsdale, N.J. 07642

[21] Appl. No.: 16,647

[22] Filed: Feb. 13, 1987

Related U.S. Patent Documents

Reissue of:

[64] Patent No.: 4,523,936
Issued: Jun. 18, 1985
Appl. No.: 634,048
Filed: Jul. 25, 1984

[51] Int. Cl.[4] ..... B07D 45/18
[52] U.S. Cl. ..... 55/429; 55/DIG. 3
[58] Field of Search ..... 15/352, 353; 55/378, 55/429, DIG. 3

[56] References Cited

U.S. PATENT DOCUMENTS

| | | | |
|---|---|---|---|
| 2,892,511 | 6/1959 | Gall et al. | 55/378 |
| 3,320,727 | 5/1967 | Farley et al. | 55/DIG. 3 |
| 3,653,190 | 4/1972 | Lee et al. | 55/302 |
| 3,740,933 | 6/1973 | Hollowell | 55/429 |
| 3,771,664 | 11/1973 | Schrink et al. | 55/378 X |
| 4,133,769 | 1/1979 | Morgan | 55/378 X |

*Primary Examiner*—Charles Hart
*Attorney, Agent, or Firm*—David A. Jackson; Richard M. Goldberg; Barbara L. Renda

[57] ABSTRACT

The invention comprises a negative-pressure plastic bag leader in the form of a cylindrical chamber into which the plastic bag is received. The chamber is double-walled, an outer wall being imperforate, and the inner wall being foraminous, and the two being spaced apart, in a substantial concentricity, to define an annular void therebetween. A closure caps the upper, open end of the chamber, and has a conduit in traverse thereof through which to admit gas, and refuse suspended in such gas into the chamber. Further, the closure has an aperture formed therethrough for communicating with a source of negative pressure, and for extracting gas from the chamber. The aperture opens into the chamber and also into the annular void. Accordingly, both the chamber and the annular void experience the same negative pressure, and the plastic, refuse-collecting bag is held securely in place against the inner wall of the chamber. Additionally, the chamber walls and the closure hold the uppermost end of the bag in position, and cooperate with the end of the bag to seal the chamber fully circumferentially thereof.

14 Claims, 1 Drawing Sheet

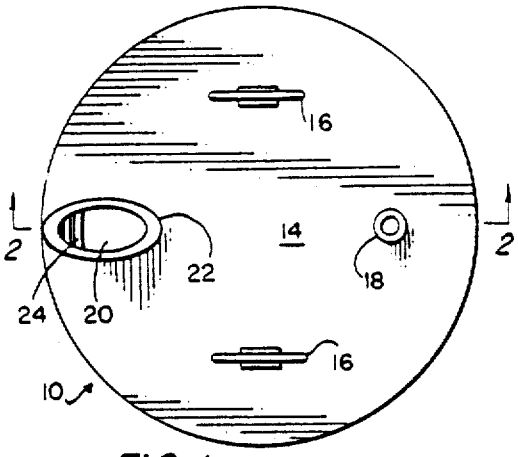
FIG. 1
FIG. 3
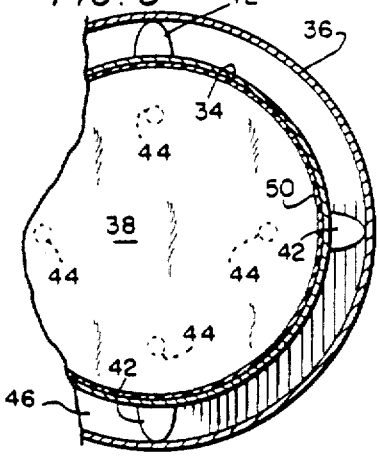
FIG. 5
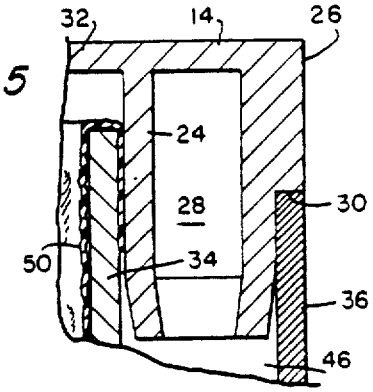
FIG. 2
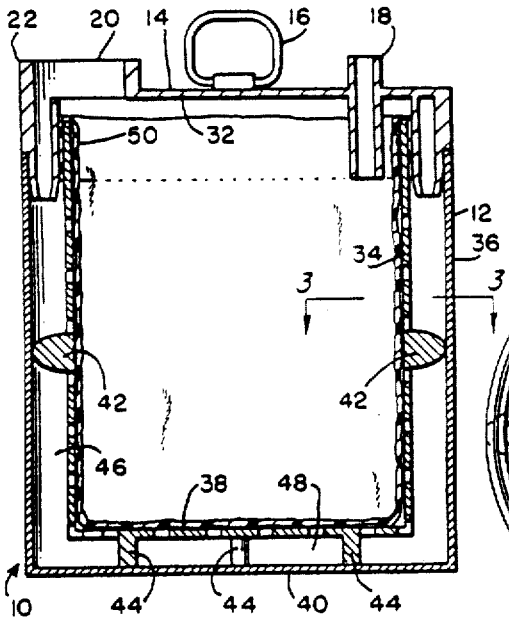
FIG. 4
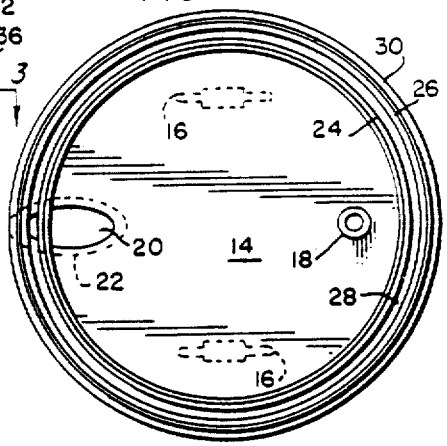

SEPARATION-CHAMBER MEANS

Matter enclosed in heavy brackets [ ] appears in the original patent but forms no part of this reissue specification; matter printed in italics indicates the additions made by reissue.

This invention pertains to negative-pressure, refuse collection apparatus and systems, and in particular to separation-chamber means for use in such apparatus and systems.

Separation-chamber means of the type to which the invention pertains are known in the prior art, and an exemplary example thereof is disclosed in U.S. Pat. No. 3,755,992, issued on Sept. 4, 1973, to Laurie L. Ylinen, for "Lawn Vacuum Cleaning and Packing Apparatus". In the aforesaid patent, a chamber is provided into which is disposed a refuse collection bag. Vacuum means are provided to ingest leaves, grass clippings, and the like into the chamber and into the bag. Too, to aid in an extension of the bag into the chamber, for its refuse-collection purpose, the patentee teaches the use of a pipe opening into the far end of the chamber which communicates with the vacuum source. The pipe is intended to draw air from the box to allow the closed end of the bag to expand into the thus-evacuated far end of the box.

The patentee's teaching is not sufficiently efficient. In that the vacuum pipe affords but one opening into the chamber or box, a surface of the bag will be drawn to the opening and promptly terminate further evacuation of the chamber. Hence, the bag will not be fully expanded and extended therewithin. With the bag only partially extended and expanded, there is a great likelihood that it will be sucked into the vacuum source via the other end of the chamber.

This technology has long sought an improved, efficient separation-chamber means, for use in a negative-pressure, collection system, and it is an object of my invention to set forth just such an improved means.

It is particularly an object of this invention to disclose a separation-chamber means, for use in a negative-pressure, collection system, for collecting refuse, such as debris, particulate matter, and the like, comprising means defining a chamber in which to collect refuse; said chamber having a separation-collection area formed therewithin; and means engageable with said chamber for (a) admitting gas, and refuse suspended in such gas, into said chamber, and for (b) discharging gas from said chamber; wherein said chamber has an imperforate, outer wall, and a feraminous, inner wall; said walls are generally concentric, defining an annular void therebetween; and said admitting and discharging means comprises means for evacuating gas from said annular void.

Further objects of this invention, as well as the novel features thereof, will become more apparent by reference to the following description, taken in conjunction with the accompanying figures, in which:

FIG. 1 is a top or plan view of my novel separation-chamber means according to an embodiment of the invention;

FIG. 2 is a cross-sectional view of the embodiment of FIG. 1, taken along section 2—2 of FIG. 1;

FIG. 3 is a partial, cross-sectional view, the same being taken along section 3—3 of FIG. 2;

FIG. 4 is a bottom view of the closure of the separation-chamber means; and

FIG. 5 is an enlarged detail, of a portion of the closure-to-chamber interface, showing the upper end of a collection bag secured in place and sealing the chamber circumferentially thereof.

As shown in the figures, my inventive separation-chamber means 10 comprises a dual-walled chamber 12, and a closure 14. Closure 14 has a pair of handle grips 16 fixed to the outer surface thereof, a conduit 18 in traverse thereof, and an elliptical aperture 20 formed therethrough. An elliptical collar 22 circumscribes the aperture 20, and is provided for attaching thereto a source of negative pressure. Extending normal to the closure 14 are a pair of substantially parallel ribs 24 and 26, the two being spaced apart in a general concentricity to define a space 28 therebetween. Rib 26 comprises the outermost periphery of the closure and, intermediate its extent, has a shoulder 30 formed therein in the outer surface thereof. The ribs 24 and 26 are integral with the flat, planar portion 32 of the closure, fully thereabout, excepting where the aperture 20 is formed. Here the aperture 20 opens across a short portion of rib 24; hence, the aperture 20 opens into fluid communication with the space 28. As noted, collar 22 is provided for communication with a source of negative pressure. Conduit 18 is provided for admitting gas, and gas-laden refuse, into the chamber 12.

Chamber 12 has an inner, foraminous wall 34 and an outer, imperforate wall 36. Walls 34 and 36 are substantially concentric, and each is joined to a base or bottom 38 and 40, respectively, the latter being correspondingly foraminous and imperforate. Lobed spacers 42 separate the walls 34 and 36, and limbs 44 separate the bases or bottoms 38 and 40. Spacers 42 and limbs 44 are integral with the inner wall 34 and inner base or bottom 38, in this embodiment. However, they could be separate elements bolted to the wall 34 or bottom 38. Spacers 42 define an annular void 46 between the walls 34 and 36, and the limbs 44 define a space 48 between the bottoms 38 and 40, and the void 46 and space 48 are in open, free communication.

As shown, the annular void 46 has a given width, and the width encompassed by the ribs 24 and 26, and the space 28 therebetween, along the leading ends of the ribs, is substantially of the same given width. Consequently, the leading ends of the ribs 24 and 26 exhibit a snug fit into the annular void 46 of the chamber 12, upon the closure 14 being engaged with the chamber 12 (as shown in FIGS. 2 and 5). The shoulder 30 formed in rib 26 defines a limit-step for the closure 14.

The furtherest ends of the ribs 24 and 26 are slightly turned inwardly toward the space 28; this is so that the nesting of the closure 14 with the chamber 12 can be effected with a minimum of difficulty.

My separation-chamber means 10, of course, is designed to collect refuse within the chamber 12, with the refuse being confined in a disposable bag, however. A plastic, disposable bag 50 is shown within the chamber 12, with the open end thereof turned over onto the leading or uppermost end of the wall 34. It will be appreciated that two particular benefits proceed from this arrangement. For one, rib 24 and wall 34 cooperate to clasp the uppermost, open end of the bag 50 and keep it secure. Too, the clasped end of the bag 50 cooperates with the rib 24 and wall 34 to seal the chamber thereat, fully circumferentially thereof.

When the separation-chamber means 10 is to be put to use, the bag 50 is set into the chamber 12, and expanded somewhat about the wall 34. The uppermost, open end of the bag 50 is turned over onto the upper end of the wall 34. Then the closure 14 is slidably engaged with the chamber; the ribs 24 and 26 are slid into the uppermost reach of the annular void 46 until the shoulder 30 engages the top of the wall 36. Now, upon collar 22 being coupled to a source of vacuum pressure, the aperture 20 will address the vacuum or negative pressure to both the annular void 46 and to the inner volume of the chamber 12. As the bag 50 experiences a same negative pressure both within and without, it remains stable and in place. The void 46 and space 48 wholly surround the bag 50 with the same negative pressure which obtains within the inner volume of the chamber. More, the top of the bag 50 is held securely in place, and the same provides its own sealing—or, sealing of the chamber.

While I have described my invention in connection with a specific embodiment thereof, it is to be clearly understood that this is done only by way of example, and not as a limitation to the scope of my invention, as set forth in the objects thereof and in the appended claims.

I claim:

1. Separation-chamber means, for use in a negative-pressure, collection system, for collecting refuse, such as debris, particulate matter, and the like, comprising:

means defining a chamber in which to collect refuse;

said chamber having an imperforate outer wall and a foraminous inner wall;

said walls being generally concentric defining an annular void therebetween;

a separation-collection area formed within said foraminous inner wall;

means for (a) admitting gas, and refuse suspended in such gas, into said separation-collection area, and for (b) discharging gas from said separation-collection area; wherein said outer wall has a bottom and an open top;

said admitting and discharging means comprises means for admitting gas into said separation-collection area, as aforesaid, through said open top, and means for discharging gas from said separation-collection area, as aforesaid, also through said open top; and said discharging means comprises port means opening externally of said separation-collection area, and opening internally and commonly, onto both said separation-collection area and said annular void, through said open top.

2. Separation-chamber means, according to claim 1, wherein:

said inner wall has a base joined thereto, said base also being foraminous;

said outer wall bottom also being imperforate;

said base and bottom are set apart from each other in a general parallelism, defining a space therebetween; and said space and said annular void are in open, common communication.

3. Separation-chamber means, according to claim 1, wherein:

said annular void has a given, annular width;

said chamber-engageable means comprises a closure for said chamber;

said closure has a peripheral channel formed by concentric, substantially parallel ribs; and said ribs and said channel together comprise a prescribed annular width which substantially corresponds to said given, annular width of said void.

4. Separation-chamber means, according to claim 1, wherein:

said chamber-engageable means comprises a closure for said chamber;

said closure has an outermost peripheral wall; and said outermost peripheral wall has a shoulder formed therein for effecting an abutting engagement thereof with said outer wall of said chamber.

5. Separation-chamber means, according to claim 1, wherein:

said chamber-engageable means comprises a conduit for admitting gas and refuse suspended in such gas therethrough into said chamber.

6. Separation-chamber means, according to claim 1, wherein:

said chamber-engageable means comprises a closure;

said closure has a through-going aperture formed therein; and said aperture is disposed for communicating with both said area within said chamber and said annular void, upon said closure being set into engagement with said chamber.

7. Separation-chamber means, according to claim 3, wherein:

one of said ribs, and one of said chamber walls, together comprise means for clasping therebetween, and retaining, the uppermost open end of a refuse collection container.

8. Separation-chamber means, according to claim 3, wherein:

one of said ribs and one of said chamber walls comprise means cooperative with the uppermost open end of a refuse collection container for sealing said chamber fully circumferentially thereof.

*9. Separation-chamber means, for use in a negative-pressure, collection system, for collecting refuse, such as debris, particulate matter, and the like, comprising:*

*means defining a chamber in which to collect refuse;*

*said chamber having an imperforate outer wall and a foraminous inner wall;*

*said walls being generally concentric defining an annular void therebetween;*

*a separation-collection area formed within said foraminous inner wall;*

*means for (a) admitting gas, and refuse suspended in such gas, into said separation-collection area, and for (b) discharging gas from said separation-collection area; wherein*

*said outer wall has a bottom and an open top;*

*said admitting and discharging means comprises means for admitting gas into said separation-collection area, as aforesaid, through said open top, and means for discharging gas from said separation-collection area, as aforesaid, also through said open top; and*

*supply means for supplying a substantially equal negative pressure to said separation-collection area and said annular void, from a common source of negative pressure, to discharge gas from said separation-collection area and to maintain a refuse bag contained in said separation-collection area in an opened condition.*

*10. Apparatus for separating and collecting refuse in a refuse bag, comprising:*

*an imperforate outer wall;*

*a foraminous inner wall positioned within said outer wall and defining a separation-collection chamber therewithin for containing said refuse bag;*

*an annular void defined between said inner wall and said outer wall;*

*means for admitting gas, and refuse suspended in said gas, into the refuse bag in said separation-collection chamber; and*

*means for supplying a substantially equal negative pressure to said separation-collection chamber and said annular void, from a common source of negative pressure, to discharge gas from said separation-collection chamber area and to maintain the refuse bag in an opened condition.*

*11. Apparatus according to claim 10; wherein said inner wall is open at one end thereof and said outer wall is open at one end thereof adjacent the open end of said inner wall; and said means for admitting extends through the open ends of said outer and inner walls to admit gas, and refuse suspended in said gas, into the refuse bag.*

*12. Apparatus according to claim 11; wherein said separation-collection chamber and said annular void are in fluid communication via the open end of said inner wall.*

*13. Apparatus according to claim 11; further comprising removable cover means for covering the open ends of said inner and outer walls; and wherein said means for admitting gas extends through said cover means into said separation-collection chamber.*

*14. Apparatus according to claim 10; wherein said inner wall has a foraminous annular wall and a foraminous bottom wall secured to said annular wall.*

* * * * *